United States Patent
Cohen

(10) Patent No.: US 8,756,741 B2
(45) Date of Patent: Jun. 24, 2014

(54) DEVICE WITH A SCRAPER AND A REMOVAL HEAD

(71) Applicant: Snow Joe, LLC, Edison, NJ (US)

(72) Inventor: Joseph S Cohen, New York, NY (US)

(73) Assignee: Snow Joe, LLC, Edison, NJ (US)

( * ) Notice: Subject to any disclaimer, the term of this patent is extended or adjusted under 35 U.S.C. 154(b) by 0 days.

(21) Appl. No.: 13/894,717

(22) Filed: May 15, 2013

(65) Prior Publication Data

US 2014/0007364 A1   Jan. 9, 2014

Related U.S. Application Data

(63) Continuation of application No. 13/544,557, filed on Jul. 9, 2012, now Pat. No. 8,464,387.

(51) Int. Cl.
*A47L 13/12* (2006.01)

(52) U.S. Cl.
USPC ............ 15/105; 15/111; 15/144.4; 15/236.02

(58) Field of Classification Search
USPC .............. 15/105, 111, 144.4, 236.02, 236.05, 15/245.1
See application file for complete search history.

(56) References Cited

U.S. PATENT DOCUMENTS

| | | | |
|---|---|---|---|
| 5,005,246 A | 4/1991 | Yen-Hui | |
| 5,067,197 A * | 11/1991 | Cormier | 15/244.1 |
| 5,313,683 A | 5/1994 | Dickie | |
| 6,256,829 B1 | 7/2001 | Hatch | |
| 6,481,041 B1 * | 11/2002 | Ingram | 15/111 |
| 6,625,837 B2 * | 9/2003 | Jiang | 15/105 |
| 6,990,705 B1 | 1/2006 | Schouten | |
| 7,155,770 B2 * | 1/2007 | Anderson et al. | 15/111 |
| 7,343,637 B2 | 3/2008 | Lafleur | |
| 7,617,559 B2 | 11/2009 | Jiang | |
| 7,930,795 B1 | 4/2011 | Johnston | |
| 7,987,816 B1 * | 8/2011 | Walsh | 119/61.56 |
| 8,312,589 B1 * | 11/2012 | Thomas | 15/236.02 |
| 2002/0078518 A1 * | 6/2002 | Jiang | 15/111 |
| 2004/0163194 A1 * | 8/2004 | Wang | 15/117 |
| 2004/0250365 A1 * | 12/2004 | Anderson et al. | 15/111 |
| 2006/0200932 A1 | 9/2006 | Byrnes | |
| 2006/0207042 A1 | 9/2006 | DiPaolo | |
| 2006/0230560 A1 | 10/2006 | Sampaio | |
| 2007/0187964 A1 | 8/2007 | Marble | |
| 2007/0234497 A1 * | 10/2007 | Lee | 15/144.1 |
| 2009/0007353 A1 * | 1/2009 | Sampaio | 15/111 |
| 2009/0183330 A1 | 7/2009 | Jiang | |

* cited by examiner

*Primary Examiner* — Monica Carter
*Assistant Examiner* — Michael Jennings
(74) *Attorney, Agent, or Firm* — Seyfarth Shaw LLP; Ilan N. Barzilay

(57) ABSTRACT

A device or tool for removing snow and other debris from vehicles, and other surfaces including a handle having a first end and a second end opposite the first end, a scraper portion coupled to the first end, and a head coupled to the second end. The head may be a laterally extended foam head that is non-abrasive, freeze resistant, and durable. The handle may include a telescopic extension to allow a reach of a user to be increased or decreased allowing the user to clear away snow and other debris from various sizes of vehicles.

11 Claims, 9 Drawing Sheets

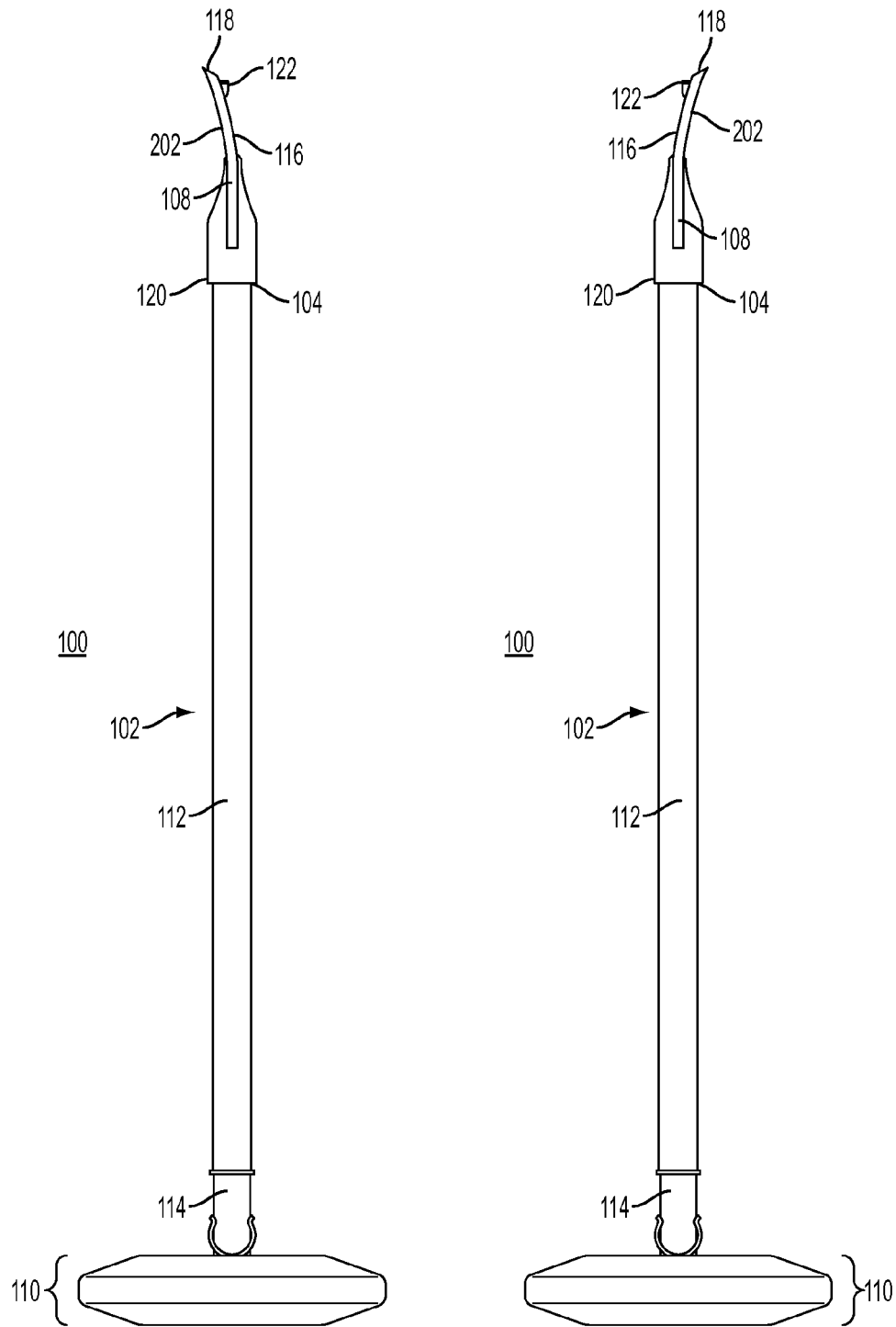

DEVICE WITH A SCRAPER AND A REMOVAL HEAD

CROSS REFERENCES TO RELATED APPLICATIONS

This application is a continuation of and claims the benefit of U.S. patent application Ser. No. 13/544,557, filed on Jul. 9, 2012, the contents of which are incorporated herein by reference in their entirety.

FIELD

The present disclosure relates to devices for removing snow and other debris from vehicles, structures, and other areas.

BACKGROUND

In general, during the winter months certain geographic areas experience colder temperatures and snowfall. During and after periods of snowfall, vehicles and other areas may be coated or covered with varying amounts of snow and ice. The efficiency and usefulness of current devices to remove such snow and ice are limited based on the amount of snowfall and the size of the vehicle.

SUMMARY

An extendable device or tool for removing snow and other debris from vehicles, and other articles and structures is disclosed herein. In general, the extendable device includes a telescopic extension having a first end and a second end opposite the first end, a scraper portion coupled to the first end, and a head, for example, a foam head, coupled to the second end. The head may be coupled to the second end of the telescopic extension by a first plate that is disposed in a first recess on a first side of the head. The first plate may include a threaded connection adapted to couple to a corresponding threaded connection on the second end of the telescopic extension.

A second plate may be disposed in a second recess on a second side of the head and be adapted to couple to the first plate. At least one prong may protrude from the first plate and be adapted to receive and extend around at least a portion of an exterior surface of the telescopic extension to couple the telescopic extension to the head when the device is not in use.

The telescopic extension may further include a first elongated portion and a second elongated portion adapted to be received within the first elongated portion. The second elongated portion may include a threaded male locking portion on an end that is received in the first elongated portion. A threaded female locking portion adapted to mate with the threaded male locking portion may be disposed in the first elongated portion. A retaining cap may be coupled to an end of the first elongated portion and adapted to retain the threaded female locking portion in the first elongated portion.

The threaded male locking portion may have a decreasing cross-sectional area from a first end to a second end. Similarly, the threaded female locking portion may have a decreasing cross-sectional area from a first end to a second end. The threaded female locking portion may include at least one slot extending from the first end towards the second end along at least a portion of the threaded female locking portion, and at least one engagement protrusion on an exterior surface of the threaded female locking portion and adapted to engage an inner surface of the first elongated portion.

The threaded male locking portion and the threaded female locking portion allow the telescopic extension to be locked in place at a desired length. When the threaded male locking portion and the threaded female locking portion are not engaged with one another, the second elongated portion may be moved to extend further out of or received further into the first elongated portion. When the desired length is achieved, the threaded male locking portion may be threaded into the threaded female locking portion causing the at least one engagement protrusion on the first end of the threaded female locking portion to exert a force against the inner surface of the first elongated portion and lock the telescopic extension at a desired length. Connections may be provided to attach the extension to the head portion so that the device may be stored when not in use.

This allows the extendable device to be adjusted for use by various users and to be used with various vehicles. By extending or retracting the extendable device, the reach of the user can be increased or decreased allowing the user to clear away debris and snow from various sizes of vehicles. Driving with snow on top of a vehicle can be hazardous and in some instances may even be unlawful. The extendable device allows the user to reach not only a hood of the vehicle but also a top of the vehicle that may be difficult to reach with a conventional brush. Additionally, placement of the scraper portion on the opposite end of the removal head allows users to remove different kinds of debris (for example, ice versus snow) from a vehicle with a single device.

BRIEF DESCRIPTION OF THE DRAWINGS

An embodiment of an extendable device is illustrated in the figures of the accompanying drawings which are meant to be exemplary and not limiting, in which like references are intended to refer to like or corresponding parts, and in which:

FIG. 2 illustrates a second-side elevation view of the extendable scraper and removal head;

FIG. 3 illustrates a third-side elevation view of the extendable scraper and removal head;

DETAILED DESCRIPTION

Figure 1:
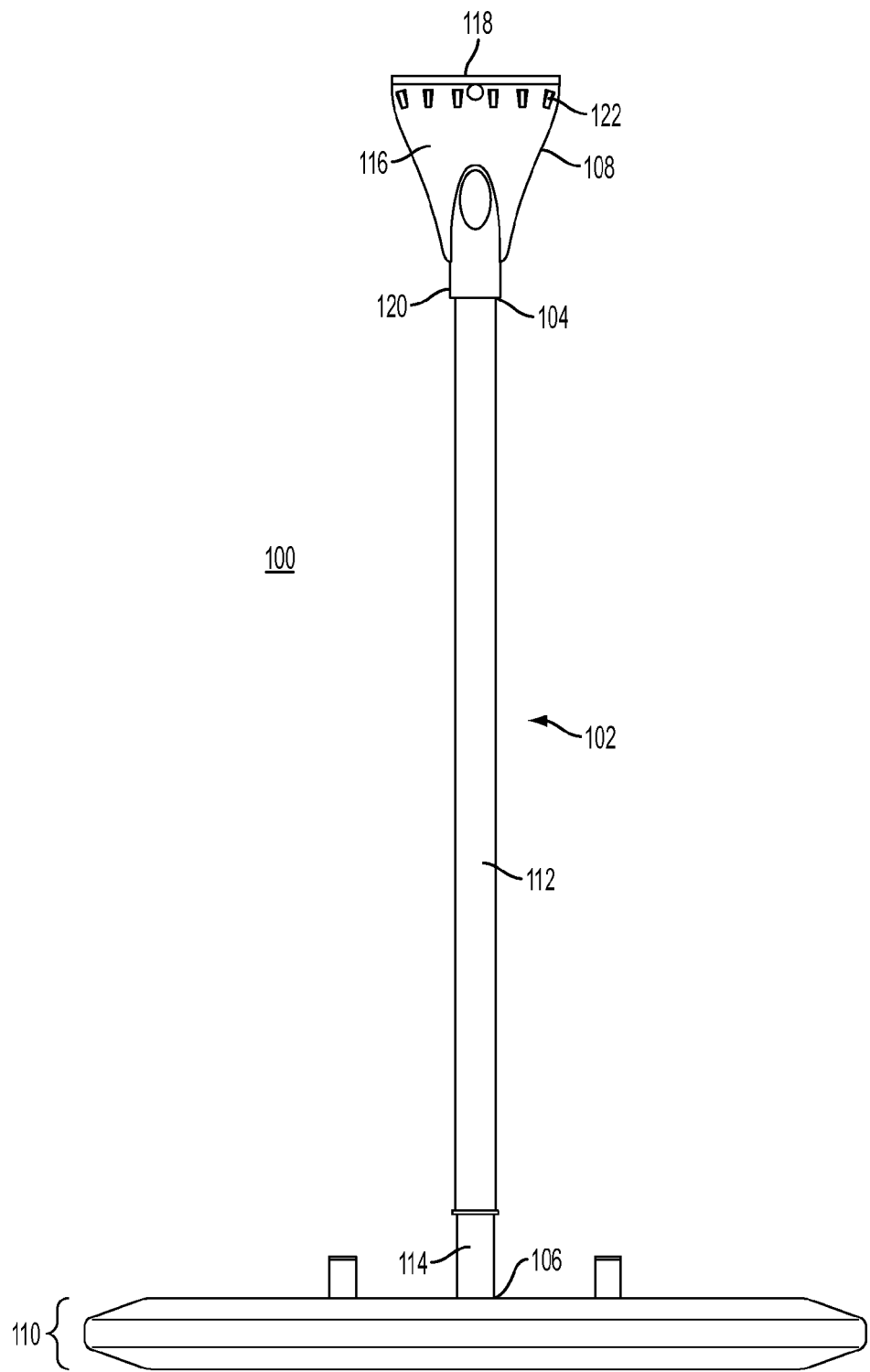
FIG. 1 illustrates a first-side elevation view of an embodiment of an extendable scraper and removal head.
Figure 4:
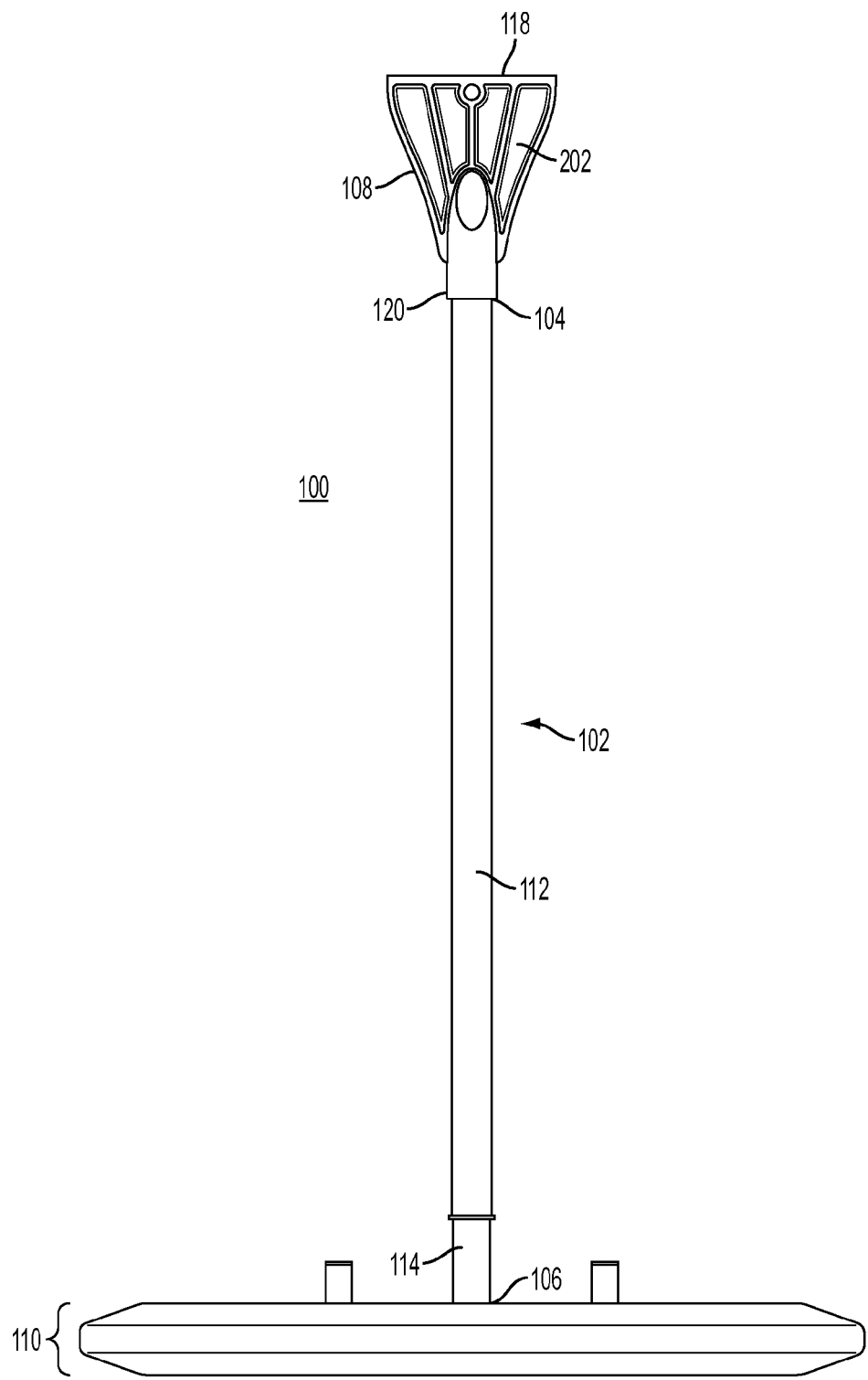
FIG. 4 illustrates a fourth-side elevation view of the extendable scraper and removal head.
Figure 5:
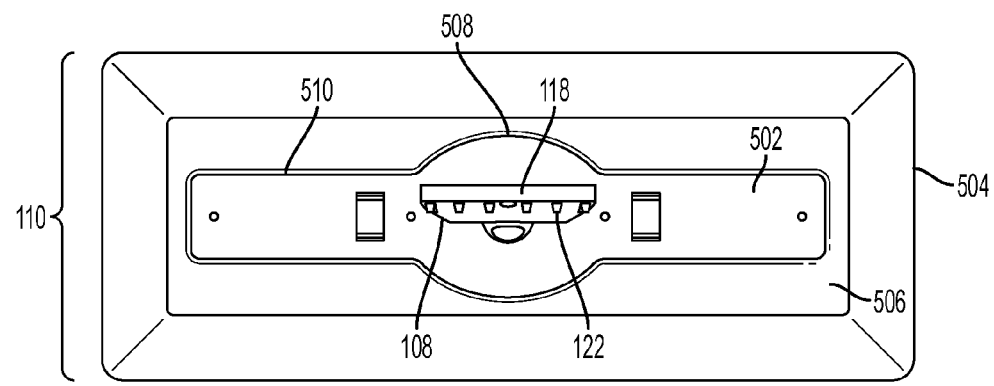
FIG. 5 illustrates an elevation view of the extendable scraper and removal head illustrating a first side of the removal head.
Figure 6:
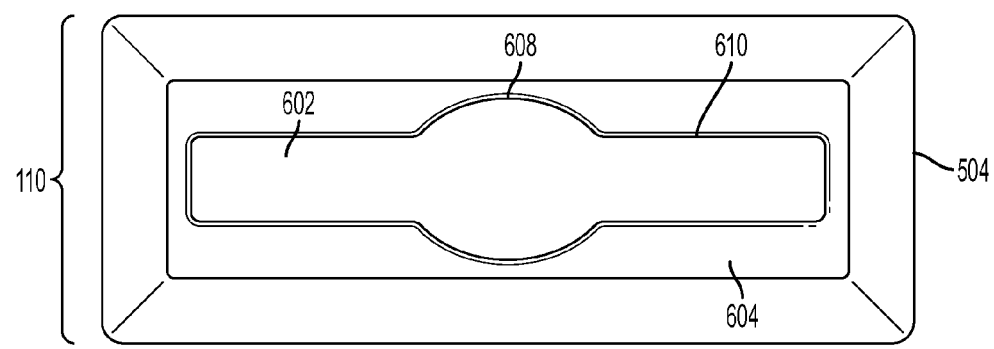
FIG. 6 illustrates an elevation view of the extendable scraper and removal head illustrating a second side of the removal head.
Figure 7:
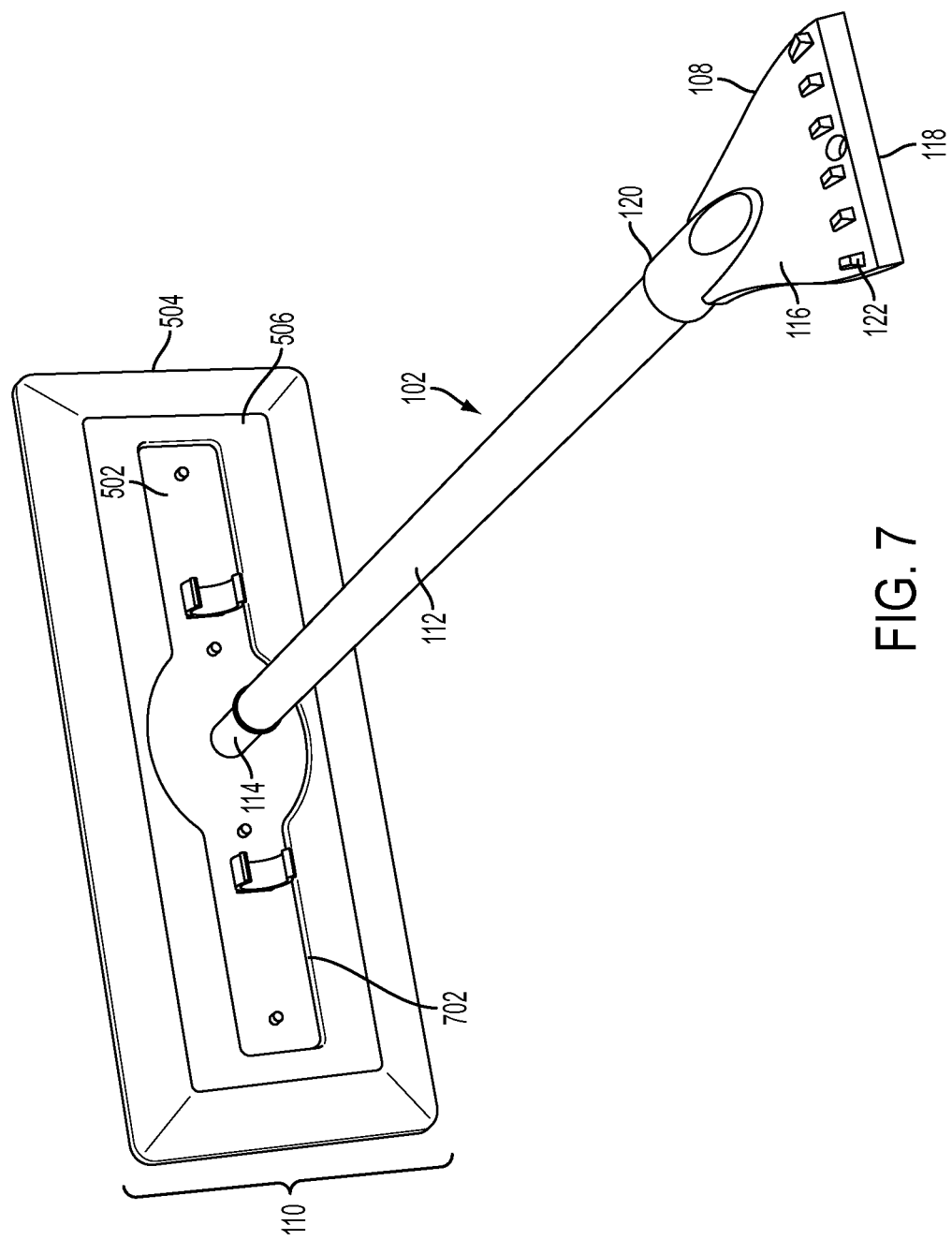
FIG. 7 illustrates a perspective view of the extendable scraper and removal head illustrating the first side of the removal head.
Figure 8:
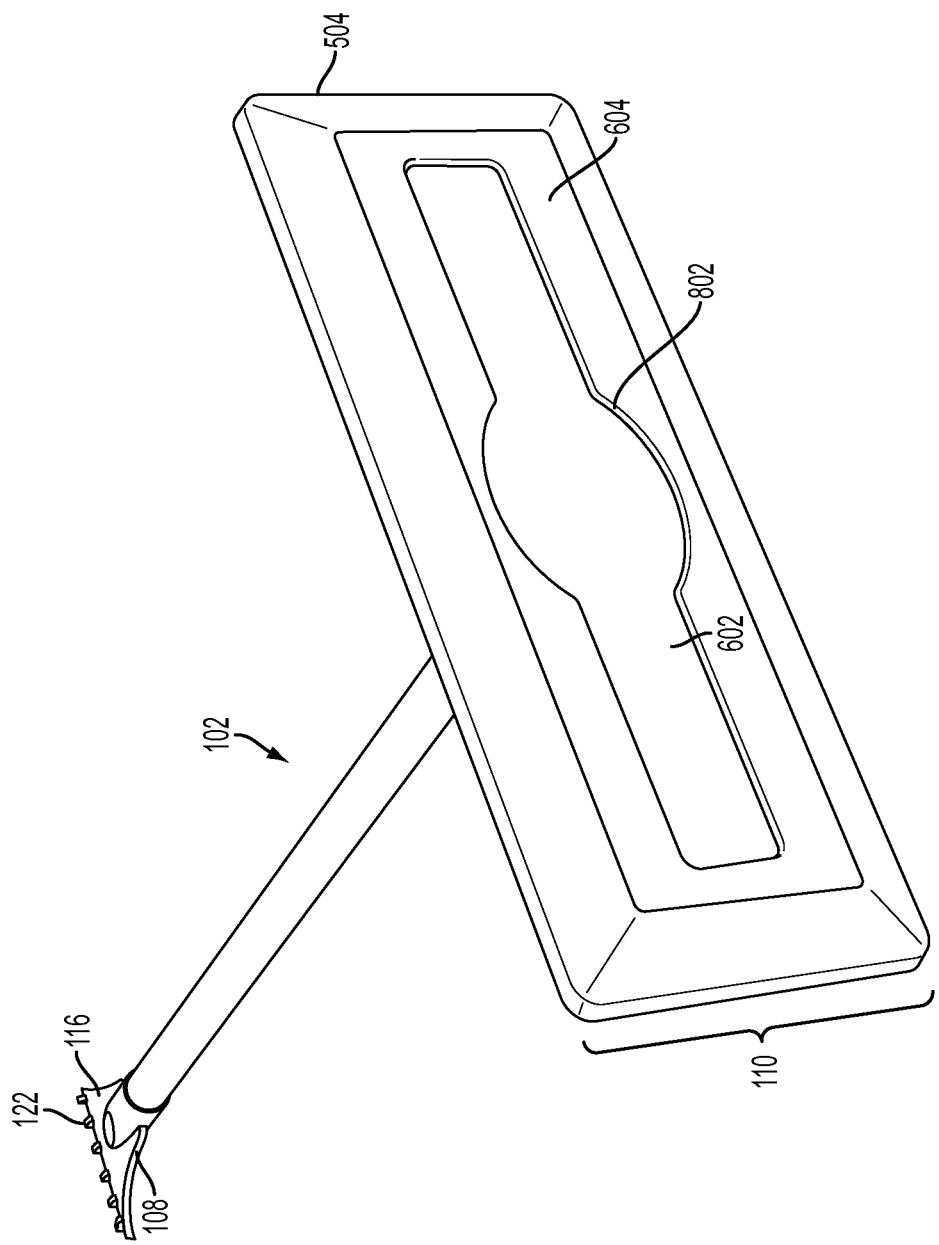
FIG. 8 illustrates a perspective view of the extendable scraper and removal head illustrating the second side of the removal head.

Detailed embodiments of extendable devices for removing snow and other debris from vehicles, and other articles and structures are disclosed herein, however, it is to be understood that the disclosed embodiments are merely exemplary of the device, which may be embodied in various forms. Therefore, specific functional details disclosed herein are not to be interpreted as limiting, but merely as a basis for the claims and as a representative basis for teaching one skilled in the art to variously employ the present disclosure.

An extendable device 100 for removing snow, ice, and other debris from vehicles, and other articles and structures according to an illustrative embodiment is described with reference to FIGS. 1-4. As illustrated, the extendable device 100 includes an extension 102 having a first end 104 and a second end 106 opposite the first end 104. A scraper portion 108 is coupled to the extension 102 at the first end 104, and a removal head 110 is adapted to couple to the extension 102 at the second end 106.

The extension 102 may be telescoping and include a locking feature to allow a length of the extension 102 to be adjusted and locked into place. As illustrated, the extension 102 may include one or more elongated portions, for example, a first elongated portion 112 and a second elongated portion 114, telescopically coupled together. The first elongated portion 112 may be adapted to receive the second elongated portion 114, and the second elongated portion 114 may be adapted to telescopically extend out of and retract into the first elongated portion 112. In this illustrative embodiment, the first elongated portion 112 is hollow, which allows the second elongated portion 114 to be received or slid into an end of the first elongated portion 112. In other illustrative embodiments, the second elongated portion 114 may be adapted to receive the first elongated portion 112. In one embodiment, the extension 102 may be a non-extending handle.

In an illustrative embodiment, the scraper portion 108 has a first side 116, a second side 202, a first end 118, and a second end 120. The first side 116 may have a convex shape and the second side 202 may have a corresponding concave shape causing the scraper portion 108 to be curved for engagement of first end 118 of the scraper portion 108 with a surface, for example, a window of a vehicle. The scraper portion 108 may also include one or more protrusions 122 projecting from the first side 116 of the scraper portion 108 proximate the first end 118. The one or more protrusions 122 may be useful in breaking, weakening, or scoring snow and ice. The second end 120 of the scraper portion 108 may be coupled to the first end 104 of the extension 102, for example, using one or more fasteners, adhesives, a male/female threaded engagement, and/or other coupling means of the type. Placement of the scraper portion 108 at the opposite end of the extension 102 from the removal head 110 allows a user to remove different materials (for example, ice versus snow) from a vehicle using the device 100.

Referring to FIGS. 5-8, in an illustrative embodiment, the removal head 110 includes a first plate 502, a body portion or head 504, and a second plate 602. The removal head 110 is structured to enable pushing or pulling of debris, such as snow, leaves, etc. to remove the debris from a vehicle or structure. The removal head 110 is extended laterally to allow a larger amount of debris to be removed in a single push or pull by a user. The body portion 504 may be a foam head including a first recess 702 adapted to receive the first plate 502 on a first side 506 of the body portion 504. Foam, or other compressible material, may be used on the removal head 110 to avoid scratching, or otherwise damaging a surface on which the debris is located. In addition to being non-abrasive, the material may preferably be freeze resistant and durable. The body portion 504 may include a second recess 802 adapted to receive the second plate 602 on a second side 604 of the body portion 504. The first plate 502 and the second plate 602 may be disposed in the first recess 702 and the second recess 802, respectively, and adapted to couple together and secure the body portion 504 between the first plate 502 and the second plate 602. The first recess 702 and/or the second recess 802 may reduce or prevent the first plate 502 and/or the second plate 602 from contacting, scratching, or otherwise damaging a surface, for example, a surface of a vehicle, when using the extendable device 100 to remove snow or other debris from the vehicle.

The shapes of the first plate 502 and the second plate 602 generally include substantially oval central portions 508, 608, respectively, and substantially rectangular portions 510, 610, respectively, extending from the substantially oval central portions 508, 608, respectively. As illustrated, the substantially oval central portions 508, 608 have a cross-section larger than a cross-section of the substantially rectangular portions 510, 610, respectively. The substantially oval central portions 508, 608 provide support for the body portion 504 and restrict the bending motion of the body portion 504 when the extendable device 100 is being used. This allows the device 100 to remove heavy amounts of snow and other debris from vehicles, and other articles and structures.

Figure 9:
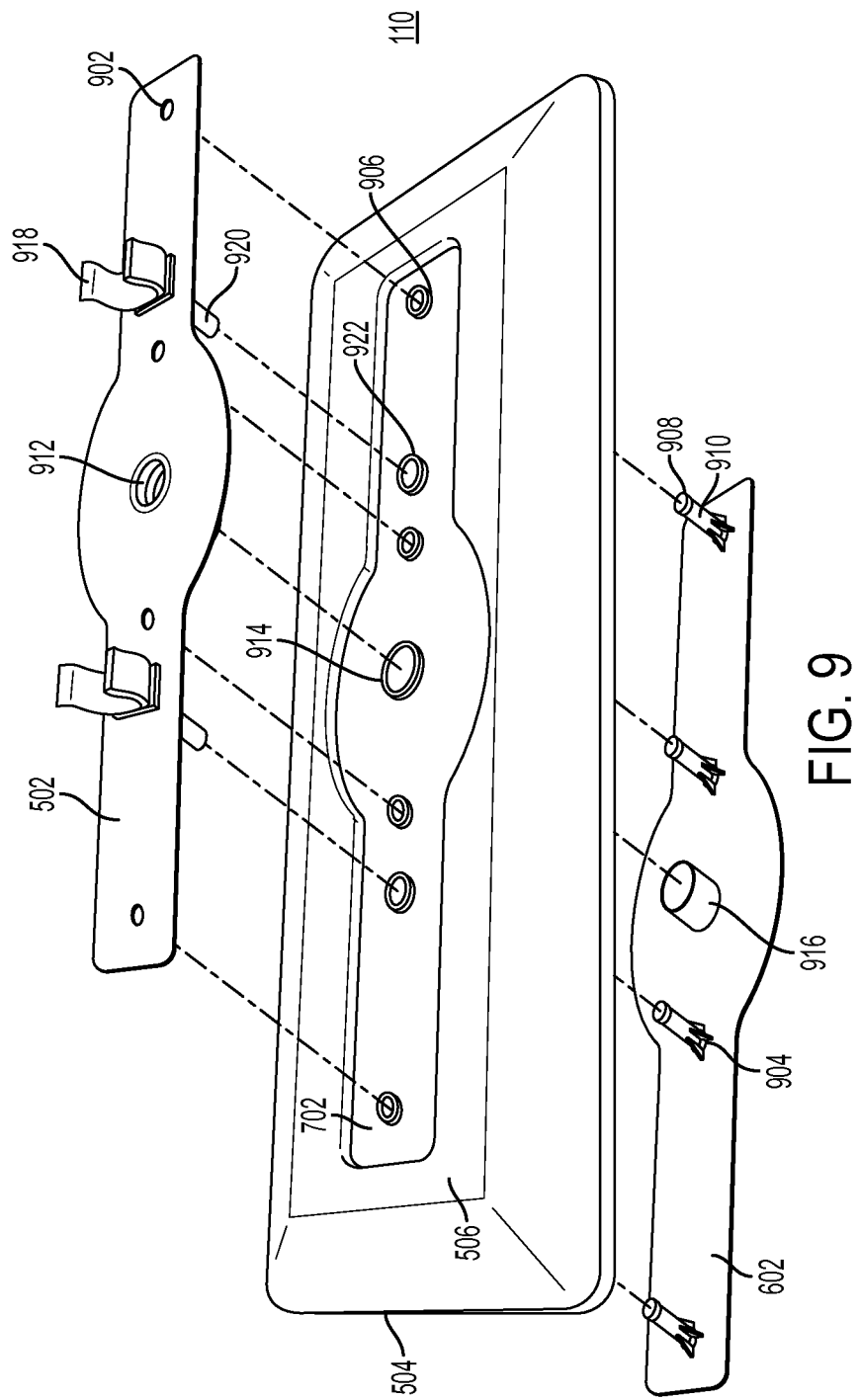
FIG. 9 illustrates an exploded view of the removal head.

Referring to FIG. 9, the first plate 502 and the second plate 602 may be coupled together by, for example, one or more fasteners, adhesives, mating protrusions and apertures, and other coupling means of the type. As illustrated, the first plate 502 includes one or more connection apertures 902, and the second plate 602 includes one or more corresponding protrusions 904 that mate with the one or more connection apertures 902. The body portion 504 may also include one or more corresponding apertures 906 adapted to receive the one or more protrusions 904. The one or more protrusions 904 may include a head portion 908 adapted to be received in a connection aperture 902, and a stem portion 910. The one or more protrusions 904 may extend through the one or more apertures 906 in the body portion 504 and the one or more connection apertures 902 in the first plate 502, and couple the first plate 502 and the second plate 602 together. In other illustrative embodiments, the second plate 602 may include one or more connection apertures and the first plate 502 may include one or more corresponding protrusions.

As illustrated in FIG. 9, the removal head 110 includes a threaded female connection 912, for example, in the first plate 502, and the second end 106 of the extension 102 includes a threaded male connection 1002 (illustrated in FIG. 10) adapted to engage or mate with the threaded female connection 912 of the removal head 110. In one embodiment, the removal head 110 may include a corresponding aperture 914 in the body portion 504 adapted to receive an exterior of the threaded female connection 912, and the second plate 602 may include a corresponding protrusion 916 adapted to align with the threaded female connection 912 for support. In other illustrative embodiments, the second end 106 of the extension 102 may include a threaded female connection and the removal head 110 may include a corresponding threaded male connection. The threaded connections allow the removal head 110 to be disconnected, detached, or removed from the extension 102.

Figure 10:
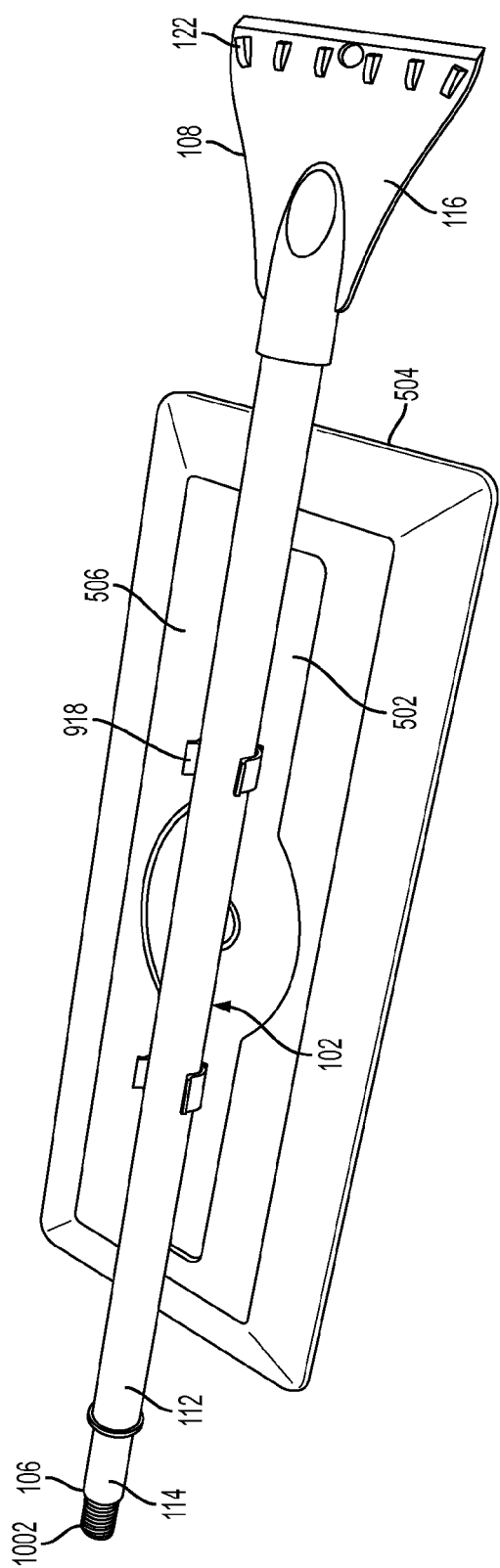
FIG. 10 illustrates a perspective view of an extension of the extendable scraper and removal head coupled to prongs of the removal head.

Referring to FIGS. 9 and 10, in an illustrative embodiment, the removal head 110 may include one or more connections 918 adapted to couple the removal head 110 to the extension 102 along the length of the extension 102 when the extendable device 100 is not in use, for example, during storage of the extendable device 100. As illustrated in FIG. 9, the one or more connections 918 may be resiliently deflectable prongs protruding from the first plate 502 of the removal head 110. Other connecting structures may be used as well. The one or more connections 918 may also include one or more protrusions or aligning portions 920 protruding from the first plate 502 opposite the one or more connections 918. The one or more protrusions or aligning portions 920 may be received in one or more corresponding apertures 922 in the body portion 504 of the removal head 110. The resiliently deflectable prongs are shaped to receive and extend around at least a portion of an exterior surface of the extension 102 and couple the removal head 110 to the extension 102, or vice versa.

Figure 11:
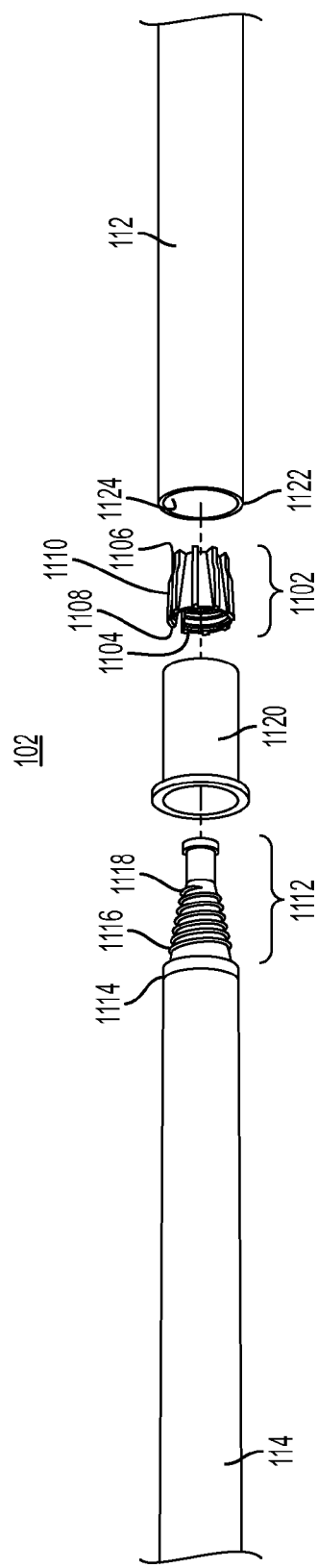
FIG. 11 illustrates an exploded view of the extension of the extendable scraper and removal head.

The extension may also include a locking feature adapted to lock the extension in place at a desired length. As illustrated in FIG. 11, the second elongated portion 114 may be retracted into or extended from the first elongated portion 112 to adjust the length of the extension 102. The length of the extension may be locked in place by twisting/rotating the first elongated portion 112 and/or the second elongated portion 114 around an axis extending along the length of the extension 102.

In an illustrative embodiment, the extension 102 includes a threaded female locking portion 1102 having a first end 1104 and a second end 1106. As illustrated, the first end 1104 has a first cross-sectional area and the second end 1106 has a second cross-sectional area less than the first cross-sectional area of the first end 1104. The cross-sectional area of the threaded female locking portion 1102 may decrease along a length of the threaded female locking portion 1102 from the first end 1104 to the second end 1106. The threaded female locking portion 1102 may include one or more slits or slots 1108 extending along a portion of the length of the threaded female locking portion 1102 from the first end 1104. The threaded female locking portion 1102 may also include one or more engagement protrusions 1110 around an exterior surface of the threaded female locking portion 1102 and extending at least a portion of the length of the threaded female locking portion 1102 from the first end 1104 to the second end 1106.

The second elongated portion 114, or the first elongated portion 112 if the first elongated portion 112 is received within the second elongated portion 114, includes a threaded male locking portion 1112 on an end 1114 that is received within the first elongated portion 112. The threaded male locking portion 1112 includes a first threaded end 1116 and a second threaded end 1118. The first threaded end 1116 has a first cross-sectional area and the second threaded end 1118 has a second cross-sectional area less than the first cross-sectional area of the first threaded end 1116. Similar to the threaded female locking portion 1102, the cross-sectional area of the threaded male locking portion 1112 may decrease along a length of the threaded male locking portion 1112 from the first threaded end 1116 to the second threaded end 1118.

The threaded female locking portion 1102 is received within the first elongated portion 112, or the second elongated portion 114 if the first elongated portion 112 is received within the second elongated portion 114. A retaining cap 1120 may be coupled to the first elongated portion 112 at an end 1122 that receives the second elongated portion 114 to prevent the threaded female locking portion 1102 from falling out of or being removed from the first elongated portion 112. The second elongated portion 114 may be inserted into the first elongated 112, through the retaining cap 1120, and the threaded male locking portion 1112 mated with the threaded female locking portion 1102.

The one or more slits or slots 1108 of the threaded female locking portion 1102 allow the cross-section of the first end 1104 of the threaded female locking portion 1102 to expand and move the one or more engagement protrusions 1110 of the threaded female locking portion 1102 into engagement with an interior surface 1124 of the first elongated portion 112. As the threaded male locking portion 1112 is mated with, for example, by rotating the first elongated portion 112 and/or the second elongated portion 114, the threaded female locking portion 1102, the increasing cross-sectional area of the threaded male locking portion 1112 from the second threaded end 1118 to the first threaded end 1116 causes the first end 1104 of the threaded female locking portion 1102 to expand. This expansion causes the one or more engagement protrusions 1110 of the threaded female locking portion 1102 to exert a force against an interior surface 1124 of the first elongated portion 112, thereby locking the extension 102 at a desired length.

The length of the extension 102 can be adjusted by decreasing the amount of engagement or mating of the threaded male locking portion 1112 with the threaded female locking portion 1102 causing the first end 1104 of the threaded female locking portion 1102 to retract. This retraction causes the one or more engagement protrusions 1110 of the threaded female locking portion 1102 to reduce the force exerted against the interior surface 1124 of the first elongated portion 112, thereby allowing the length of the extension 102 to be adjusted.

In an illustrative embodiment, the length of the extension 102 may be about twenty five (25) inches to about thirty five (35) inches when the extension 102 is fully retracted and about forty five (45) inches to about fifty five (55) inches when the extension 102 is fully extended. Although the length of the extension 102 is described as a range, it should be appreciated that the extension 102 can be modified to have any desired length when retracted and extended.

In an illustrative embodiment, one or more of the scraper portion 108, the extension 102, and the first and second plates 502 and 602, respectively, of the removal head 110 may be made, formed, or molded out of one or more polymers or plastics, for example, high impact polystyrene and other high impact plastics. In other embodiments, one or more of the extension 102 and the first and second plates 502 and 602, respectively, of the removal head 110 may be metal, wood, and/or other material of the type.

In an illustrative embodiment, the body portion or head 504 of the removal head 110 may be made, formed, or molded out of a flexible and durable polymer, for example, polyethylene foam. The polyethylene foam can provide a non-abrasive, freeze resistant, and durable body portion or head 504 that can be used to remove snow and other debris, for example, leaves, dirt, sticks, and branches, from vehicles and other surfaces.

In an illustrative embodiment, the removal head 110 and the extension 102 may be connected via an articulation joint, for example, a ball joint, to allow the removal head 110 to be rotated and position at varying angles with respect to the extension 102. Further, the articulation joint may include a lock adapted to secure the position of the removal head 110 in a desired orientation.

Although the extension 102 is illustrated as having a circular cross-section, it should be appreciated that the extension 102 may have a cross-section of various other geometric shapes, for example, oval, square, and other geometric shapes. Similarly, although the body portion or head 504 of the removal head 110 is illustrated as rectangular, it should be appreciated that the body portion or head 504 may be various other geometric shapes, for example, oval, circular, square, and other geometric shapes.

Although the removal head 110 is described and illustrated as including the first plate 502 and the second plate 602 that are coupled together, the first plate 502 and the second plate 602 may be monolithically formed or molded as a single piece. Further, it should be appreciated that other locking mechanisms may be used to lock the extension 102 at a desired length instead of the locking feature described herein.

Although the device has been described and illustrated in connection with certain embodiments, many variations and modifications will be evident to those skilled in the art and may be made without departing from the spirit and scope of the disclosure. The disclosure is thus not to be limited to the precise details of methodology or construction set forth herein as such variations and modification are intended to be included within the scope of the disclosure. Moreover, unless specifically stated any use of the terms first, second, etc. do not denote any order or importance, but rather the terms first, second, etc. are merely used to distinguish one element from another.

What is claimed is:

1. A snow removal tool, comprising:
    a laterally extended snow removal head including a first recess on a first side and a second recess on a second side;
    a first plate disposed in the first recess and including a first substantially oval central portion and first substantially rectangular portions extending in opposite directions from the first substantially oval central portion, the first substantially oval central portion having a width larger than a width of the first substantially rectangular portions and adapted to restrict a bending motion of the laterally extended snow removal head, the first substantially oval central portion including a threaded connection;
    a second plate disposed in the second recess and including a second substantially oval central portion and second substantially rectangular portions extending in opposite directions from the second substantially oval central portion, the second substantially oval central portion having a width larger than a width of the second substantially rectangular portions and adapted to restrict a bending motion of the laterally extended snow removal head, the second plate coupled to the first plate; and
    a handle including a first end adapted to couple to the threaded connection.

2. The snow removal tool according to claim 1, further comprising at least one resiliently deflectable prong protruding from the first plate and adapted to receive and extend around at least a portion of an exterior of the handle and couple the handle to the first plate when the handle is removed from the threaded connection.

3. The snow removal tool according to claim 2, in which the at least one resiliently deflectable prong includes a first resiliently deflectable prong and a second resiliently deflectable prong.

4. The snow removal tool according to claim 3, in which the first resiliently deflectable prong is disposed on one of the first substantially rectangular portions, and the second resiliently deflectable prong is disposed on another of the first substantially rectangular portions.

5. The snow removal tool according to claim 1, in which the handle is adapted to extend telescopically.

6. The snow removal tool according to claim 1, in which the handle includes a second end opposite the first end, and further comprising a snow scraper coupled to a second end.

7. The snow removal tool according to claim 1, in which the second plate includes one or more connection protrusions adapted to extend through the laterally extended snow removal head and couple the second plate to the first plate.

8. The snow removal tool according to claim 7, in which the first plate includes one or more apertures adapted to receive the one or more connection protrusions.

9. The snow removal tool according to claim 8, in which the one or more connection protrusions include a stem portion and a head portion, the head portion adapted to extend through the one or more apertures and couple the second plate to the first plate.

10. The snow removal tool according to claim 1, in which the threaded connection is a threaded female connection and an exterior surface of the threaded female connection extends into the laterally extended snow removal head.

11. The snow removal tool according to claim 10, in which the second plate includes a protrusion adapted to align with the threaded female connection and provide support to the threaded female connection.

* * * * *